United States Patent
Kordasiewicz et al.

(10) Patent No.: US 9,178,633 B2
(45) Date of Patent: Nov. 3, 2015

(54) DELIVERY QUALITY OF EXPERIENCE (QOE) IN A COMPUTER NETWORK

(75) Inventors: Roman C. Kordasiewicz, Elmira (CA); Kevin Goertz, Waterloo (CA); Anthony P. Joch, Waterloo (CA); Michael D. Gallant, Kitchener (CA)

(73) Assignee: Avvasi Inc., Waterloo, Ontario (CA)

( * ) Notice: Subject to any disclaimer, the term of this patent is extended or adjusted under 35 U.S.C. 154(b) by 35 days.

(21) Appl. No.: 13/053,650

(22) Filed: Mar. 22, 2011

(65) Prior Publication Data

US 2013/0041998 A1 Feb. 14, 2013

Related U.S. Application Data

(60) Provisional application No. 61/407,531, filed on Oct. 28, 2010.

(51) Int. Cl.

| | |
|---|---|
| *H04H 60/33* | (2008.01) |
| *H04N 21/44* | (2011.01) |
| *H04L 12/24* | (2006.01) |
| *G06F 15/173* | (2006.01) |
| *H04N 21/258* | (2011.01) |
| *H04N 21/442* | (2011.01) |
| *H04N 21/647* | (2011.01) |
| *H04L 29/06* | (2006.01) |

(52) U.S. Cl.
CPC ............ *H04H 60/33* (2013.01); *H04N 21/258* (2013.01); *H04N 21/44004* (2013.01); *H04N 21/44209* (2013.01); *H04N 21/64723* (2013.01); *H04L 41/145* (2013.01); *H04L 41/5025* (2013.01); *H04L 65/80* (2013.01)

(58) Field of Classification Search
CPC ... H04L 41/145; H04L 41/5025; H04L 65/80; H04N 2/44004
USPC .......................................................... 709/224
See application file for complete search history.

(56) References Cited

U.S. PATENT DOCUMENTS

| | | | |
|---|---|---|---|
| 7,647,614 B2 | 1/2010 | Krikorian et al. | |
| 2005/0089043 A1* | 4/2005 | Seckin et al. | 370/395.21 |
| 2008/0155087 A1* | 6/2008 | Blouin et al. | 709/223 |
| 2009/0034426 A1* | 2/2009 | Luft et al. | 370/252 |

OTHER PUBLICATIONS

Xiangchun Tan, et al., "Perceived Video Streaming Quality under Initial Buffering and Rebuffering Degradations", Jun. 5, 2006, pp. 1-8.*
International Search Report for PCT/CA2011/001190, dated Jan. 20, 2012, 9 pages.
Brooks et al., "User Measures of Quality of Experience: Why Being Objective and Quantitative is Important", IEEE Network, p. 8-13, Apr. 2010.

(Continued)

*Primary Examiner* — Suraj Joshi (57) ABSTRACT

An apparatus generally having an interface and a circuit is disclosed. The interface may be connectable to a network to monitor a media program streaming across the network to a media client. The circuit may be configured to (i) generate first information by modeling a buffer of the media client, the first information being representative of a plurality of events related to the buffer during a playback of the media program and (ii) generate a signal representative of a quality of experience of the media program in response to the first information.

20 Claims, 8 Drawing Sheets

(56) References Cited

OTHER PUBLICATIONS

Batteram et al., "Delivering Quality of Experience in Multimedia Networks", Bell Labs Technical Journal, vol. 15, No. 1, p. 175-193, Jun. 2010.

Anonymous, "Video Streaming Quality Measurement with VSQI", Technical Paper, May 14, 2009, 14 pages.

European Search Report correlating to EP11835389 dated Jun. 4, 2014, 6 pages.

Jorgen Gustafsson et al., "Measuring Multimedia Quality in Mobile Networks with an Objective Parametric Model", ICIP 2008, 15th IEEE International Conference, Oct. 12, 2008, 4 pages.

Jorgen Gustafsson Ericsson Research et al., "P.NBAMS ToR; 379 (GEN/12)", International Telecommunication Union, Study Period 2009-2012, Sep. 17, 2010, 19 pages.

Pascal Hubbe et al., "An Innovative Tool for Measuring Video Streaming QoE", Techzine, Jan. 12, 2011, 7 pages.

Xiangchun Tan et al., "Perceived Video Streaming Quality under Initial Buffering and Rebuffering Degradations", MESAQIN Conference 2006, Jun. 5, 2006, 8 pages.

\* cited by examiner

DELIVERY QUALITY OF EXPERIENCE (QOE) IN A COMPUTER NETWORK

This application claims the benefit of U.S. Provisional Application No. 61/407,531, filed Oct. 28, 2010 and is hereby incorporated by reference in its entirety.

FIELD OF THE INVENTION

The present invention relates to computer networks generally and, more particularly, to a method and/or apparatus for implementing computation of delivery QoE in a computer network.

BACKGROUND OF THE INVENTION

Streaming media sent over various computer networks is increasingly popular. Maintaining such streaming is becoming a problem for the organizations providing and maintaining such networks. Streaming media has become an integral element of the "internet" experience through the significant availability of content from sites like YouTube, Netflix and many others. Streaming media content poses a significant load for the organizations that provide the networks for such content to be delivered. Moreover, these organizations have an interest in monitoring the quality of experience (QoE) provided through their network. In addition to the companies that provide the networks, the content producers and distributors are also interested in knowing how satisfied the end user is.

It would be desirable to estimate the impact of the delivery network on QoE of media sessions by implementing a model of human satisfaction used in the estimate.

SUMMARY OF THE INVENTION

The present invention concerns an apparatus generally having an interface and a circuit. The interface may be connectable to a network to monitor a media program streaming across the network to a media client. The circuit may be configured to (i) generate first information by modeling a buffer of the media client, the first information being representative of a plurality of events related to the buffer during a playback of the media program and (ii) generate a signal representative of a quality of experience of the media program in response to the first information.

The objects, features and advantages of the present invention include providing a method and/or apparatus for measuring a quality of experience (QoE) in a computer network that may (i) limit churn rate by monitoring quality levels, (ii) help make decisions on upgrading network resources, (iii) help make billing decisions, (iv) provide feedback into policy control mechanisms, (v) provide feedback into traffic control mechanisms, (vi) provide feedback to content distributors as to the preferred means of content delivery and/or (vii) provide feedback for customer support.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a method and/or apparatus to estimate the impact of the delivery network on Quality of Experience (QoE) of media sessions. Quality of Experience may be a subjective term used to describe how well a user is satisfied with a video presentation. Quality of Experience may be based on actual viewing of a media session. Such a calculation may be based on viewing experience, such as re-buffering events. A model of human dissatisfaction may be used in the estimation. A user model may map a set of video buffer state events to a level of subjective satisfaction (DQS) for a media session. The user model may be based on a memory model. An objective session model may map a set of hypothetical video buffer state events to an objective score (NQS) for a media session.

Figure 1:
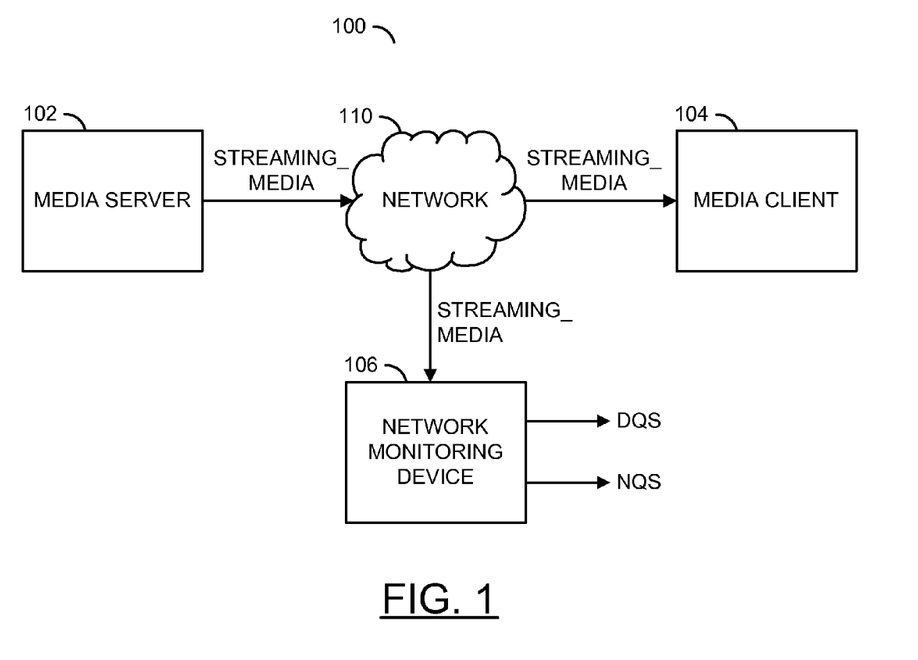
FIG. 1 is a diagram illustrating a system overview of the present invention.

Referring to FIG. 1, a block diagram of a system 100 is shown in accordance with a preferred embodiment of the present invention. The system 100 illustrates an example of a high level overview of an implementation of the present invention. The system 100 generally comprises a block (or circuit) 102, a block (or circuit) 104 and a block (or circuit) 106. The circuit 102 may be implemented as a media server. The circuit 104 may be implemented as a media client (or media player). The circuit 106 may be implemented as a monitoring device. The circuit 102 may present media content (e.g., a signal STREAMING_MEDIA) through a network 110. The network 110 may be implemented as a delivery network comprising numerous complex and/or interconnected hardware and/or software systems through which streaming media travels. The signal STREAMING_MEDIA may be presented to both the media client 104 and the network monitoring device 106. QoE estimation may be implemented in the network monitoring device 106 as media sessions (e.g., STREAMING_MEDIA) moving through the network 110 are monitored. The monitoring device 106 may be implemented in hardware, software or a combination of hardware and/or software. In one example, the monitoring device 106 may monitor traffic in Internet Protocol (IP) networks. However, the particular type of network may be varied to meet the design criteria of a particular implementation. While the monitoring device 106 is shown connected to the network 110, the monitoring device 106 may also be connected directly at the media server 102 or the media client 104.

The monitoring device 106 may inspect all packets on network interfaces (e.g., the media client 104) being monitored. The monitoring device 106 may look for media sessions on the network 110. Once a media session is detected, the state of the media client 104 is generally estimated for the purpose of QoE estimation. The state information is based on how and when a particular session is started and how the media is delivered over the network 110. The state information may then be used to either compute an estimate of a subjective delivery quality score (e.g., DQS) or an objective network quality score (e.g., NQS).

Figure 2:
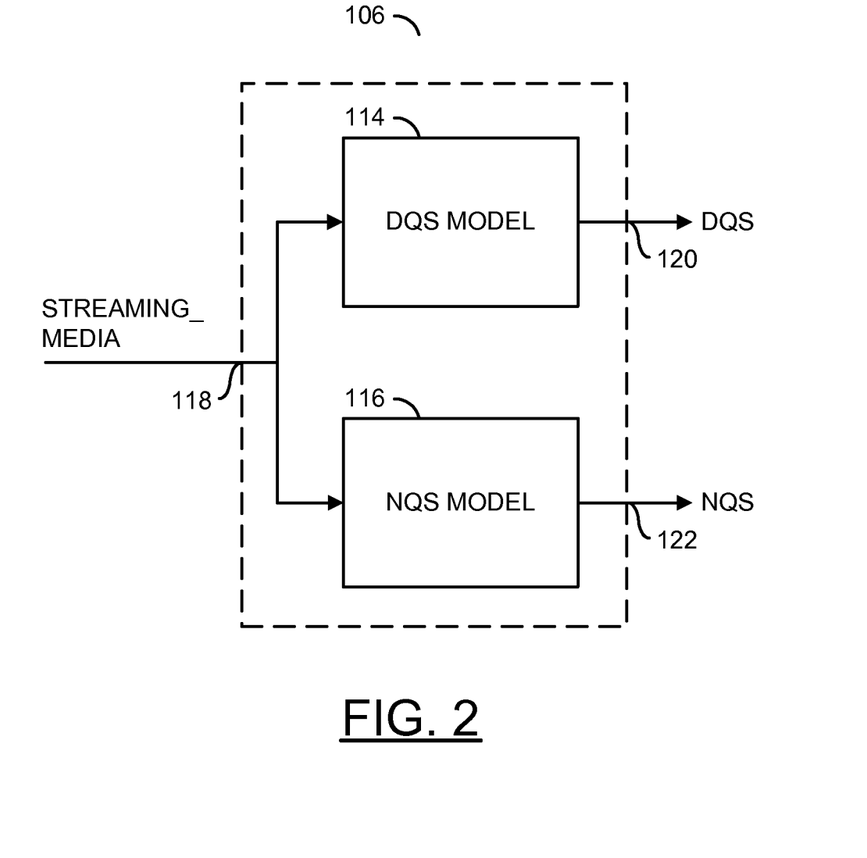
FIG. 2 is a diagram of a monitoring device.

Referring to FIG. 2, a diagram of the device 106 is shown. The device 106 generally comprises a block (or circuit) 114, and a block (or circuit) 116. The block 114 may be implemented as a DQS model. The block 116 may be implemented as an NQS model. The device 106 may have an input 118 that may receive the signal STREAMING_MEDIA, an output 120 that may present the signal DQS and an output 122 that may present the signal NQS. The signal DQS may be in a first format (e.g., as MOS range of 1 to 5), while the signal NQS may be in a second format (e.g., as a percentage). The device 106 may generate the signal DQS and the signal NQS in response to the signal STREAMING_MEDIA. The monitoring device may generate the signal DQS individually, the signal NQS individually, or a combination of the signal DQS and the signal NQS. The signal DQS and/or the signal NQS may be considered as signals expressing the impact of the delivery network on the end user quality of experience (e.g., quality of experience signal).

Figure 3:
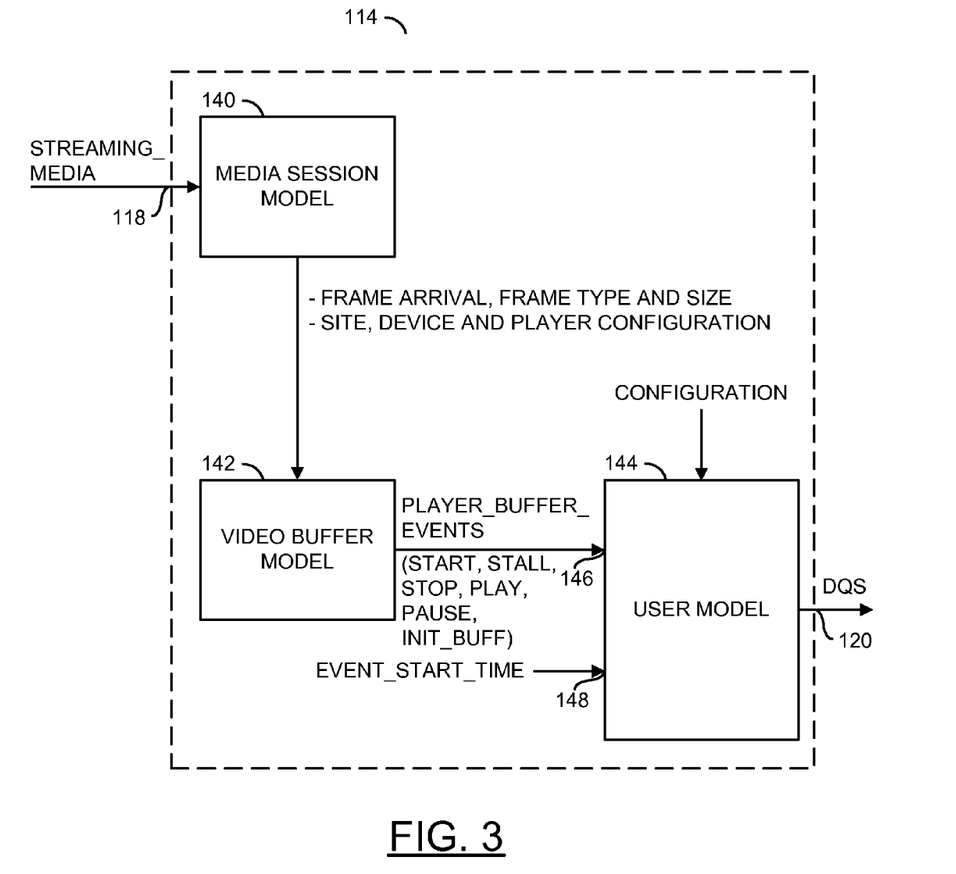
FIG. 3 is a diagram illustrating a data path of the generation of a subjective quality signal.

Referring to FIG. 3, a more detailed description of the block 114 generating a DQS data flow is shown. In one example, the block 106 is presented for the reliable transport (TCP) use case. The block 106 generally comprises a block (or circuit) 140, a block (or circuit) 142 and a block (or circuit) 144. The block 140 may be implemented as a media session model. The block 142 may be implemented as a video buffer model. The block 144 may be implemented as a user model. The block 140, the block 142, and the block 144 may be implemented as hardware, software, or a combination of hardware and/or software. The block 114 may have an input 118 that may receive the signal STREAMING_MEDIA and an output 120 that may present the signal DQS. The block 144 may have an input 146 that may receive a signal (e.g., PLAYER_BUFFER_EVENTS), an input 148 that may receive a signal (e.g., EVENT_START_TIME) and an output 120 that may present the signal DQS.

The media session model 140 may (i) assemble the network traffic (e.g., packets), (ii) track frame arrivals at the media client 104, (iii) detect site, device, player information and/or the start and end of media sessions and/or (iv) detect audio and/or video frames, including frame type and/or frame size.

The video buffer model 142 may use all or part of the information from the media session model 140 to estimate the state of the media client 104. The estimation may be presented as an event indicator in the signal PLAYER_BUFFER_EVENTS. The events may include, but are not limited to, a START event, a STALL event, a STOP event, a PLAY event, a PAUSE event and a SEEK event. The state (event) information may then be used by the user model 144 to compute a value for the signal DQS. The signal DQS may be a unique signal that may be computed for each media session. The value of the signal DQS may be sampled throughout the media session. A value of the signal DQS may then be stored to an external system (e.g., a memory or other storage device—not shown).

The user model 144 may compute a subjective quality score that may be an estimation of a user experience of streaming media as affected by perceivable transmission impairments. The signal DQS may be an estimate of a subjective score based on input from the video buffer model 142. The subjective score may be an estimate of an actual video buffer within the media client device 104. It may be desirable to have an objective score in addition to a subjective score. The block 116 may compute an objective score signal NQS (to be described in more detail in FIG. 6).

Figure 4:
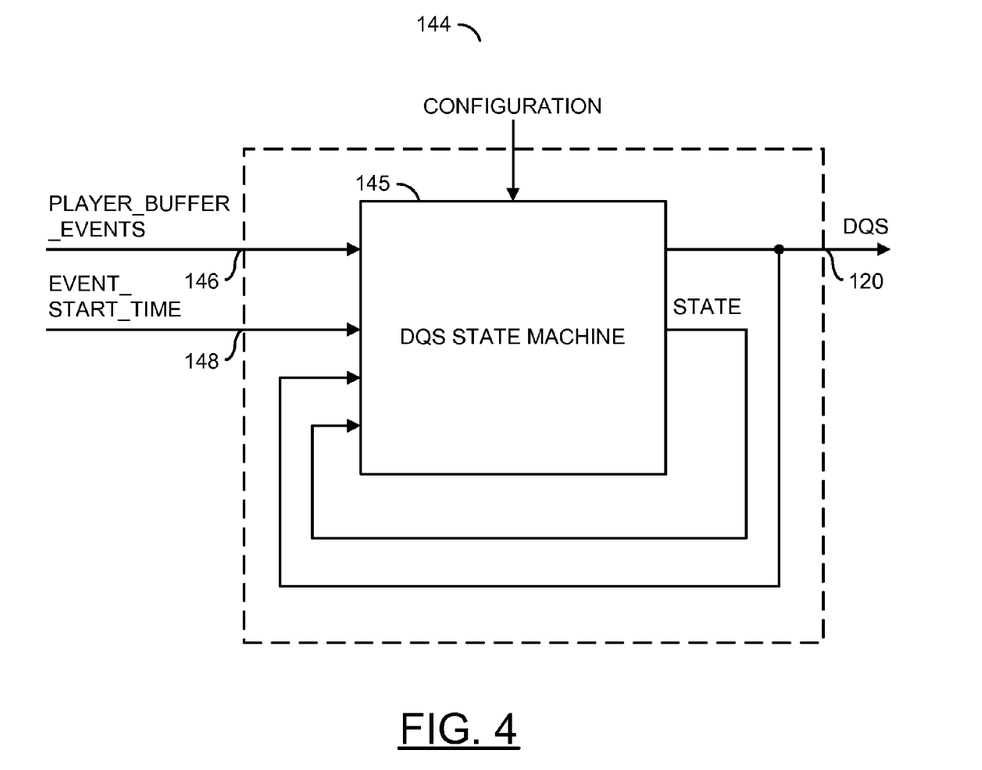
FIG. 4 is a diagram of an example of the user model of FIG. 3.

Referring to FIG. 4, a diagram of an example of the user model 144 is shown. The user model 144 may include a state machine 145. The state machine 145 may generate the signal DQS in response to the signal PLAYER_BUFFER_EVENTS, and the signal EVENT_START_TIME. The state machine 145 may generate a signal STATE that may be presented as a feedback. The signal STATE may indicate a current state of the state machine 145. The signal DQS may also be presented as a feedback. The state machine 145 may adjust the current value in the signal DQS based on the previous value feed back in the signal DQS.

Figure 5:
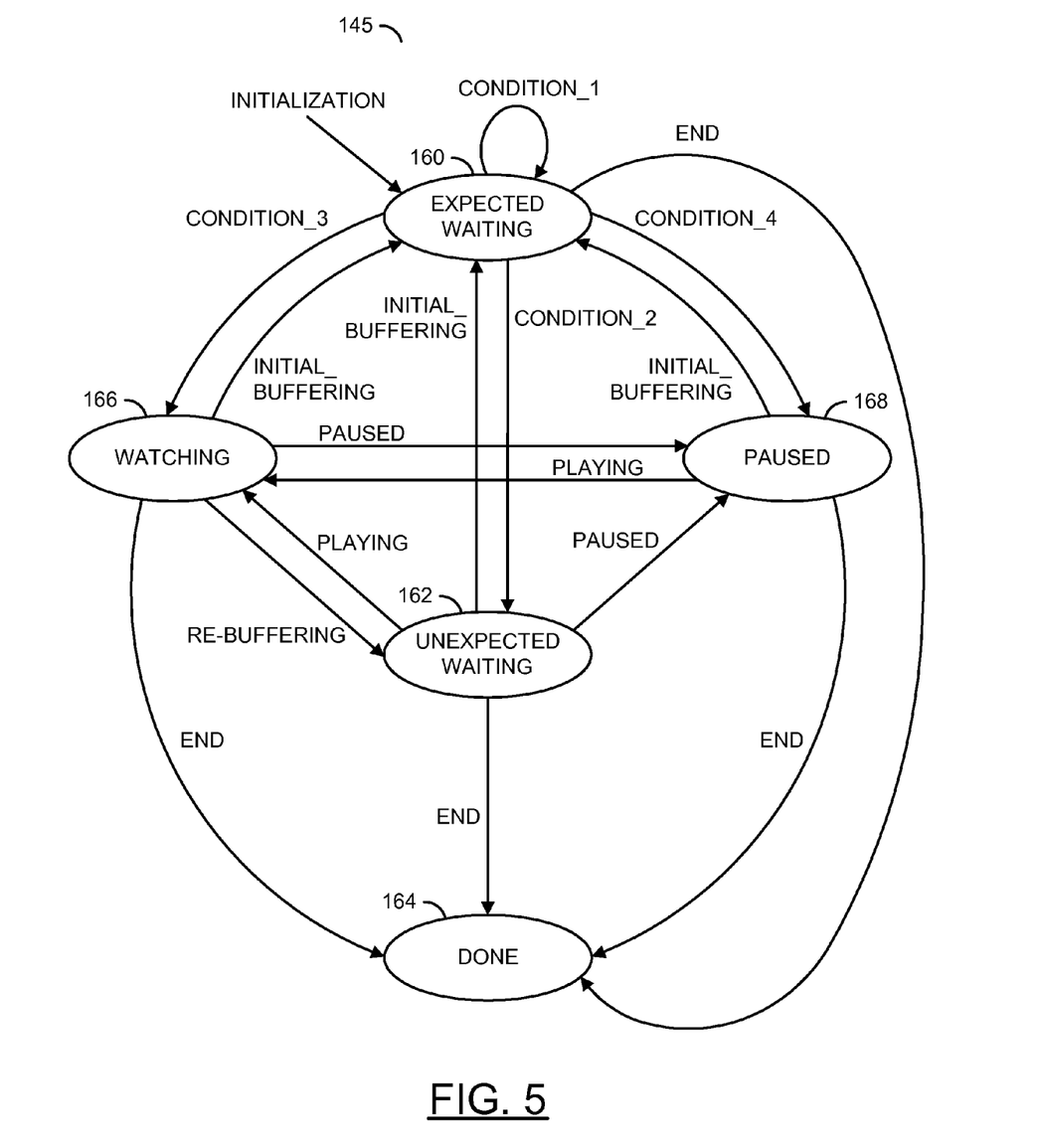
FIG. 5 is a diagram of a state machine implementation of the user model.

Referring to FIG. 5, a state diagram of the state machine 145 is shown. The state machine 145 generally comprises a state (or step) 160, a state (or step) 162, a state (or step) 164, a state (or step) 166 and a state (or step) 168. The state 160 may be used as an expected waiting state. The state 162 may be an unexpected waiting state. The state 164 may be a complete (or done) state. The state 166 may be a watching state. The state 168 may be a paused state. The states 160 to 168 may be implemented as hardware, software, or a combination of hardware and/or software. The state machine 145 may update periodically (e.g., once per second). At each of the updates, the state machine 145 may or may not change states depending upon the current state and the information received in the signals PLAYER_BUFFER_EVENTS and EVENT_START_TIME. The state machine 145 may also update a satisfaction value (or level) in the signal DQS at each update.

The state machine 145 may initialize to the state 160 upon assertion of the signal EVENT_START_TIME. The assertion of the signal EVENT_START_TIME generally indicates that streaming of a media program has begun. The user normally expects that an initial delay (e.g., 3 seconds or less) may be experienced between the beginning of the stream and the appearance of the video and/or audio from the media client device 104.

While the state machine 145 is in the state 160, an initial buffering of the video and/or audio as received from the network 110 generally takes place in the media client device 104. The buffering may be modeled by the video buffer model 142. Since the user expects the initial buffering delay, an anxiety of the user may remain unaltered by the state machine 145. The satisfaction value in the signal DQS may remain unaltered at a current value by the state machine 145. A high satisfaction value (e.g., 5) generally means that the user is happy. A low satisfaction value (e.g., 1) may indicate that the user is unhappy.

A condition (e.g., CONDITION_1) may occur if the state machine 145 cycles while in the state 160, the initial buffering is still in progress, and less than the full initial buffering delay has elapsed since the signal EVENT_START_TIME was asserted. The CONDITION_1 generally leaves the state machine 145 in the state 160 to continue the initial buffering. The state machine 145 may leave the signal DQS unchanged by the CONDITION_1.

A condition (e.g., CONDITION_2) may occur if the state machine cycles while in the state 160, the initial buffering is still in progress, and the user has waited for the entire initial buffering delay (e.g., waited more than 3 seconds). Occurrence of the CONDITION_2 generally causes the state machine 145 to transition from the state 160 to the state 162. In the state 162, the buffering may continue. The continuing delay may be perceived by the user as an unexpected delay. Therefore, the state machine 145 may reduce the satisfaction value in the signal DQS over time while in the state 162. Changing the satisfaction value in the signal DQS is generally described in more detail below.

When in state 160, a condition (e.g., CONDITION_3) may occur if the initial buffering has finished within the initial delay time (e.g., ≤3 second) and the signal PLAYER_

BUFFER_EVENTS indicates that the media program has started playing (e.g., the START event and/or the PLAY event). The CONDITION_3 generally causes the state machine 145 to transition from the state 160 to the state 166.

The state 166 may indicate that the user is experiencing (e.g., watching) the media program. Therefore, the state machine 145 may increase the satisfaction value in the signal DQS.

When in state 160, a condition (e.g., CONDITION_4) may occur if the initial buffering has finished within the initial delay time and the signal PLAYER_BUFFER_EVENTS indicates that the media program has been paused (e.g., the PAUSE event) by the user. The CONDITION_4 generally causes the state machine 145 to transition from the state 160 to the state 168. The state 168 generally means that the media program is currently paused. Since the user initiated the pause, the state machine 145 may hold the satisfaction value unchanged as long as the state machine 145 is in the state 168.

While in the state 168, the user may resume playback of the media program. The resumption may be indicated in the signal PLAYER_BUFFER_EVENTS (e.g., the START event and/or the PLAY event) by the video buffer model 142. The state machine 145 may respond to the resumed playback condition (e.g., PLAYING) by transitioning from the state 168 to the state 166.

While in the state 166, the video buffer model 142 may indicate that all of the content of the media program previously received from the network 110 has been read from the buffer (e.g., a stall in the playback). The video buffer model 142 may indicate the stall to the state machine 145 in the signal PLAYER_BUFFER_EVENTS (e.g., the STALL event). The state machine 145 generally treats the stall event as a condition (e.g., RE-BUFFERING). From the state 166, the state machine 145 may transition to the state 162 in response to the condition RE-BUFFERING. The user may perceive the stall in the playback as an unexpected delay. Therefore, the state machine 145 may decrease the satisfaction value in the signal DQS while in the state 162.

Once the video buffer model 142 indicates that a sufficient amount of content has been received from the network 110 to resume the playback, the video buffer model 142 generally informs the state machine 145 via the signal PLAYER_BUFFER_EVENTS (e.g., the START event). From the state 162, the state machine 145 may consider the reception of the START event as the condition PLAYING. As such, the state machine 145 may transition from the state 162 to the state 166 at the next state machine cycle.

If the user pauses the playback while the state machine 145 is in either the state 166 or the state 162, the condition PAUSE may exist. At the next state machine cycle, the state machine 145 may transition from the state 162 or 166 to the state 168. If sufficient content is buffered when the media program resumes playback, the state machine 145 may transition from the state 168 to the state 166. If insufficient content is buffered when the media program resumes playback, the resulting delay until may be perceived by the user as a normal buffering delay. Therefore, the state machine 145 may transition from the state 168 to the state 160.

If the user temporally jumps forward or backward in the playback of the media program, the video buffer model 142 may indicate the jump in the signal PLAYER_BUFFER_EVENTS (e.g., the INITIAL_BUFFERING event). If the seek is sufficiently forward or backwards in time, the content being sought may not be currently buffered. A delay may result while the requested content at the seek point is obtained from the media server 102. The seek delay may be perceived by the user as a normal delay. When the event INITIAL_BUFFERING is asserted, the state machine 145 may transition from any of the states 162, 166 and 168 back to the state 160 when cycled.

If the media program reaches an end, or the user intentionally stops the playback, the video buffer model 142 may inform the state machine 145 in the signal PLAYER_BUFFER_EVENTS (e.g., the STOP event). The state machine 145 may view the STOP event as the assertion of a condition (e.g., END). When the condition END is asserted, the state machine 145 may transition from any of the states 160, 162, 166 and 168 to the state 164. While in the state 164, the state machine 145 may hold the DQS value unchanged.

Figure 6:
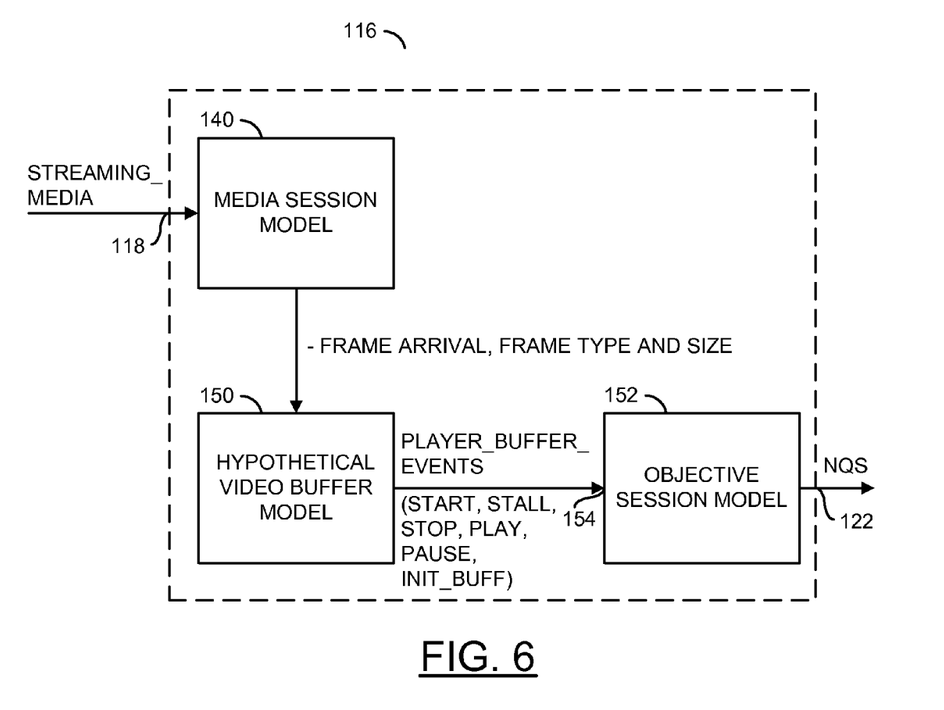
FIG. 6 is a diagram illustrating a data path of the generation of an objective quality signal.

Referring to FIG. 6, a more detailed description of the block 116 generating a data flow for generating the signal NQS is shown. The block 116 generally comprises the block 140, a block (or circuit) 150 and a block (or circuit) 152. The block 150 may be implemented as a hypothetical video buffer model. The block 152 may be implemented as an objective session model. The block 116 may have an input 118 that may receive the signal STREAMING_MEDIA and an output 122 that may present the signal NQS. The block 152 may have an input 154 that may receive the signal PLAYER_BUFFER_EVENTS and an output 122 that may present the signal NQS.

The generation of the signal NQS normally depends on many of the same inputs as the generation of the signal DQS, which may be computed by the media session model 140. The main difference between generating the signal DQS and the signal NQS is the implementation of the video buffer model 142 and the score calculation. The generation of the signal NQS may employ a hypothetical video buffer model 150, which no longer models a specific site, device, or player, but assumes a generalized greedy client. A greedy client may be defined as a client that displays a frame as soon as such a frame is delivered over the network 106. The state of the client 104 (as estimated by the hypothetical buffer model 150) may then be used by an objective session model which may calculate a score (e.g., from 0 to 100) as the signal NQS. A signal NQS may be a unique signal calculated for each media session. The value of the signal NQS may be sampled throughout the session and may be stored to an external system.

The hypothetical video buffer model 150 may be similar to the video buffer model 142 described in connection with FIG. 2. The model 150 may estimate the state of a generalized greedy client for a given media session. This imposes a tighter real-time delivery bound which may expose any deficiencies in the ability of the network 110 to deliver the media session in real time. To do this, various parameters in the video buffer model 150 may be set to the most aggressive values. The video buffer 150 may be filled at the network rate and emptied at the play rate. However, once the video buffer 150 is drained, the first frame to be removed is generally removed as soon as the first frame arrives. The hypothetical video buffer model 150 is normally a greedy buffer model. A greedy buffer model 150 may be consistent for all media sessions and may allow the calculation of a normalized score and a more objective score.

The network monitoring device 106 may be implemented as a hardware and/or software system. The device 106 may implement media session modeling. The relevant models and/or interactions have been highlighted in the previous section. In this section, various models used to compute delivery QoE are described in further detail. The various models include (i) a video buffer model, (ii) a hypothetical video buffer model, (iii) a user model, and/or (iv) an objective session model.

Figure 7:
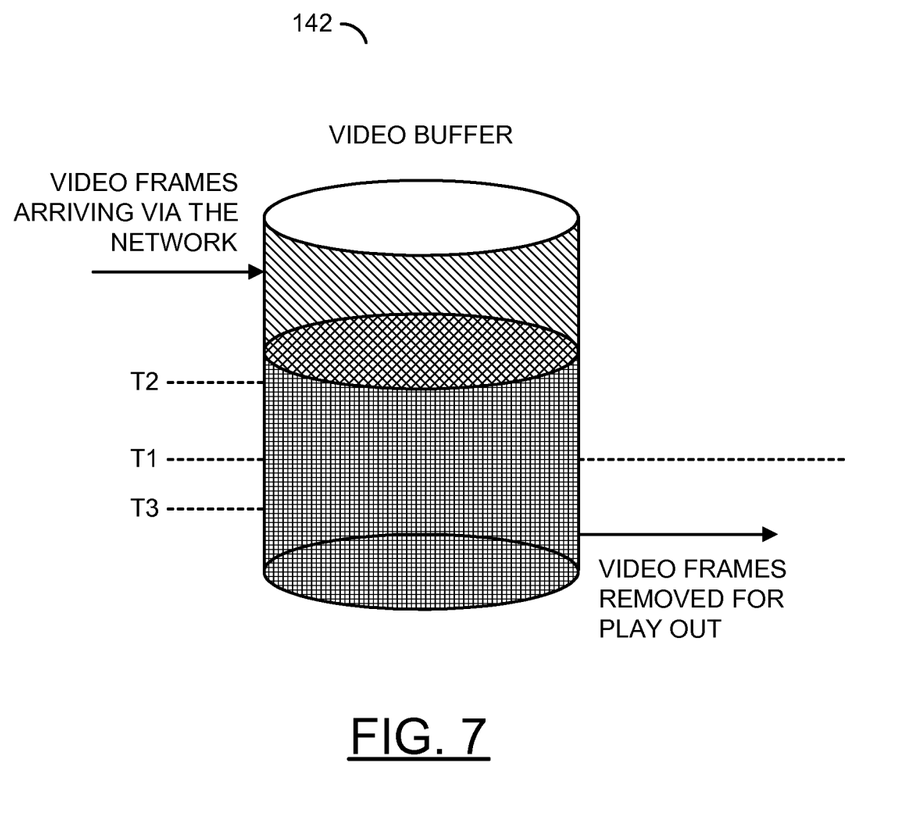
FIG. 7 is a diagram illustrating a video buffer.

Referring to FIG. 7, an illustration of the video buffer model 142 is shown. The video buffer model 142 may be implemented having a threshold T1, a threshold T2 and a threshold T3. The video buffer model 142 may estimate the state of the client 104 video buffer for a given media session. The video buffer model 142 may be implemented as a video frame queue where frames are inserted at the rate at which they arrive at the client device 104 over the network 110. The frames may be removed in a decode order at a video play rate (e.g., 24 frames per second, etc.). There are typically several unique and/or possibly dynamically changing thresholds that may be web site, device and/or player dependent. In one example, a threshold may be the amount of playback time represented by the frames in the buffer T1 that is needed in the video buffer 142 before the first video frame is removed and played at the beginning of the media session. In another example, the threshold may be the amount of playback time represented by the frames in the buffer T2 that is needed in the video buffer 142 before the first video frame is removed and played after the video buffer 142 has run empty causing the playback to stall. In another example, the buffer T3 may reach a threshold that may represent a certain minimum amount of playback time represented by the frames in the video buffer 142 that need to be maintained, where falling below this threshold may cause the media player 104 to stall.

For media sessions that are transmitted over a reliable network layer such as TCP, the only perceivable impairments due to the network are re-buffering events and/or quality changes. This is due to the fact that all video frames are guaranteed to arrive for active connections. However, the arrival time may be significantly delayed and may cause the media client 104 to drain the video buffer 142 and may cause a re-buffering event. These re-buffering events are estimated by the video buffer model 142.

For media sessions that are transmitted over an unreliable network layer (e.g., UDP) the perceivable impairments due to the network 110 are more numerous. For example, some frames or portions of frames may not arrive at the media client 104. The types of perceivable impairments may include break-up, re-buffering, skipping and/or out of sync audio/video transmissions. For a break-up, once a decoder in the media client 104 does not receive a frame or part of a frame, the media client 104 may start using incorrect reference data producing artifacts. This typically corrects itself every IDR frame. For re-buffeting, the media client 104 may attempt to buffer video before resuming playback. This is particularly useful if transmission is slower than real time due to jitter and/or congestion. Skipping causes unintentional video and/or audio jumps. Out of sync transmissions occur when video and/or audio get out of sync. Combinations of the perceivable impairments listed above may also occur.

In one example, the user model 144 for media sessions transmitted over a TCP network may be considered. The user model 144 normally receives the state of the video buffer model 142 as an input, and generates a score in a MOS scale.

Figure 8:
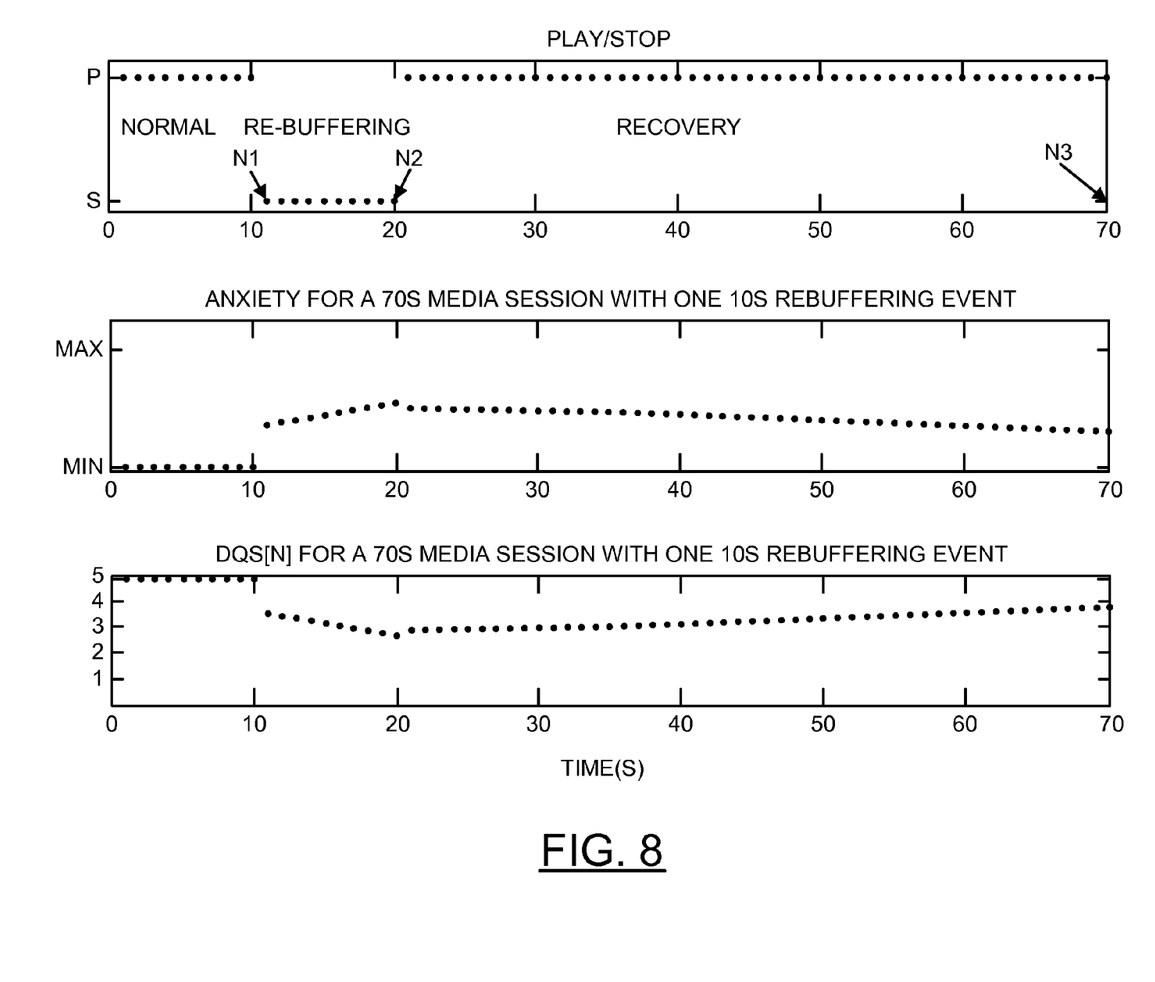
FIG. 8 is a diagram illustrating a number of graphs implementing a user model.

In FIG. 8, a 70 s media session is partitioned into three regions (top graph of FIG. 8). The "P" and "S" on the y-axis normally represent the state of the video buffer model, either playing or stopped (re-buffering). For each of these regions there is a corresponding level of dissatisfaction (middle graph of FIG. 8). In the "Normal" region, dissatisfaction is at its lowest, since everything is working normally. In the "Re-buffering" region, a re-buffering event occurs which has the immediate impact of an abrupt increase in dissatisfaction and as the event continues the dissatisfaction continues to build. In the "Recovery" region, as playback resumes there is an abrupt decrease in dissatisfaction and the dissatisfaction continues to decrease as playback resumed. Note that in the recovery region while playback continues dissatisfaction continues to decrease, there is still the memory of the re-buffering event. The recovery section may be further divided into the initial, continued, and long lasting effects to be within range. In one example, the signal DQS may be computed by scaling the user dissatisfaction function to be within the range of 0 to 4, then subtracting the scaled result from 5. The signal DQS plotted over time for this example is shown in the bottom graph of FIG. 8.

The relationships shown in FIG. 8 can be expressed by the following equation:

$$Q[n] = \begin{cases} Q_1[n], & n < n1; \\ Q_2[n], & n1 \le n < n2; \\ Q_3[n], & n3 \le n < n3; \end{cases} \qquad \text{EQ1}$$

where n1, n2 and n3 are times of the re-buffering start, re-buffering end, and video duration respectively, and function Q [n] is the signal DQS. Q1 [n], Q2 [n] and Q3 [n] are the unique functions for each or the intervals, and may be further expressed by the following equation:

$$Q[n] = \begin{cases} 5, & 0 \le n \le n1; \\ [Q[n1-1] - (n-n1) \cdot F_1[n] - F_2[n1-1]], & n1 \le n \le n2; \\ [Q[n2-1] + (n-n2) \cdot F_3[n] + F_4[n2-1]], & n2 \le n \le n3; \end{cases} \qquad \text{EQ2}$$

where F2 [n] represents initial decrease in satisfaction, F1 [n] represents continued and growing dissatisfaction, F4 [n] represents initial increase in satisfaction and F3 [n] represents a continued and growing satisfaction. The function Q[n] is clamped to be within the desired range of 1 to 5.

On average a viewer does not experience the same initial dissatisfaction for all re-buffering events. Similarly, dissatisfaction does not build the same way for the all re-buffering events. The same applies to the recovery. Before defining F1 [n], F2 [n], F3 [n], F4 [n], it is important to define vector n=(n1, n2, n3, n4 . . . ni, ni+1, ni+2). This vector is a list of times for which the video stops and starts (odd indexes indicate a re-buffering event start and even indexes indicate re-buffering event end). With the vector n defined, F2 [n] may be described by the following equation:

$$F_2[n] = \begin{cases} f_{2,1}, & \text{first re-buffering event, } n = n1; \\ f_{2,3}, & \text{second re-buffering event, } n = n3; \\ \vdots & \vdots \\ f_{2,1}, & k'\text{th re-buffering event, } n = ni; \end{cases} \qquad \text{EQ3}$$

where f2,1, f2,3 and f2,i are constants. Using different constant for each event is most accurate. However, through experiments the biggest difference in initial dissatisfaction may be found to occur between the first and subsequent events. The initial dissatisfaction following the first re-buffering event is approximately constant. However, subsequent initial dissatisfaction increases are relative to dissatisfaction level just before the event. Therefore under most circumstances, dissatisfaction jump at the start of a re-buffering event may be approximated with the following equation:

$$F_2[n] = \begin{cases} f_2, & \text{first re-buffering event}, n = n1; \\ f_2' \cdot Q[n-1], & \text{for all other re-buffering events}; \end{cases} \quad \text{EQ4}$$

where $f_2$ and $f'_2$ are constants which may be tuned. Using similar reasoning, $F_1[n]$ and $F_4[n]$ may be expressed as:

$$F_1[n] = \begin{cases} f_1, & \text{during first re-buffering event}, n \le n2; \\ f_1', & \text{for all other re-buffering events}; \end{cases} \quad \text{EQ5}$$

$$F_4[n] = \begin{cases} f_4, & \text{first re-buffering event}, n = n1; \\ f_4' Q[n-1], & \text{for all other re-buffering events}; \end{cases} \quad \text{EQ6}$$

The recovery function F3 [n] is more complex. For a short duration media sessions, F3 [n] may be approximated as:

$$F_3[n] = \begin{cases} f_{3,I}, \text{first } N \text{ sec after the} & n2 \le n < n2 + N; \\ \quad \text{first re-buffering event}, \\ f_{3,C}, \text{after } N \text{ sec after the} & n2 + N \le n < n3; \\ \quad \text{first re-buffering event}, \\ f_{3,I}', \text{after } N \text{ sec after a} & ni + 1 \le n \le ni + 1 + N; \\ \quad subsequent \text{ re-buffering event}, \\ f_{3,C}', \text{after } N \text{ sec after a} & ni + 1 + N \le n < ni + 2; \\ \quad subsequent \text{ re-buffering event}, \end{cases} \quad \text{EQ7}$$

where N≈15 sec. The subscripts I and C stand for initial and continued respectively. All of these equations may be rewritten as:

$$Q[n] = \begin{cases} 5, & 0 \le n < n1; \\ [Q[n1-1] - f_1 \cdot (n-n1) - f_2], & n1 \le n < n2; \\ [Q[n2-1] \cdot f_4' + f_{3,I} \cdot (n-n2)], & n2 \le n < n2 + N; \\ [Q[n2+N-1] + f_{3,C} \cdot (n-n2-N)], & n2+N \le n < n3; \\ [Q[n1-1] \cdot f_{2*}' - f_1' \cdot (n-n1)], & ni \le n < ni+1; \\ [Q[ni+1-1] \cdot f_{4*}' + \\ \quad f_{3,I}' \cdot (n-ni+1)], & ni+1 \le n \le \\ & ni+1+N; \\ [Q[ni+1+N-1] + \\ \quad f_{3,C}' \cdot (n-ni+1-N)], & ni+1+N \le \\ & n < ni+2; \end{cases} \quad \text{EQ8}$$

where f2*=1−f2, f4*=1+f4 and f'*=1+f4.

While the equation EQ8 may provide an accurate calculation of the signal DQS for relatively short duration media sessions, the equation EQ8 may need to be adjusted for media sessions lasting tens or hundreds of minutes. This is due to the fact that F3 [n] produced a relatively fast recovery of the signal DQS. For example given f3,I≈0.01 and f3,C≈0.02, a full recovery of the signal DQS may occur completely within minutes, but that does not correlate as well to measured user satisfaction for long media sessions. Thus, it is necessary to limit how fast and by how much Q [n] is allowed to recover for long media sessions. This can be accomplished by introducing additional recovery regions.

The user model may account for the impact of (i) one or multiple re-buffering events, (ii) variable duration of single or multiple re-buffering events, (iii) variable location within the media session of single or multiple re-buffering events, (iv) variable media session duration and/or (v) variable start up delay. The user model may also provide adaptability to different content types and demographics (either dynamic or static). This may be accomplished by adjusting the various thresholds and rates.

The user model may be presented as a discrete function or a continuous function. The user model may provide a mapping of a video buffer model state to a level of user satisfaction based on a memory model supporting (i) all variations of detectable video buffer state events, (ii) all variations in media sessions durations and/or (iii) adaptability to content type and demographics.

The objective session model may calculate an objective measure of how the network delivered content to a media client and/or if the network was able to maintain real-time delivery throughout the session. The inputs into this model may comprise events generated by the hypothetical video buffer model. These inputs may be used to calculate how much a generalized and greedy media clients generally wait on the network 110 to deliver the media session.

The signal NQS may be calculated as the percentage of play duration divided by the play duration and stalled duration. Play duration may be the amount of time a hypothetical client was playing at the desired frame rate. Stalled duration may be the amount of time a hypothetical client was waiting for frames when the client should have been playing. This includes unexpected excess waiting during initial buffering.

The score can be sampled at any point where (play duration+stalled duration)>0 according to the following formula:

$$\text{Network Quality Score} = \frac{100 \cdot \text{play duration}}{\text{play duration} + \text{stalled duration}} \quad \text{EQ9}$$

In contrast to play duration and stalled duration, there may be other time intervals during a session which do not affect network quality score, such as the amount of time the player was paused and/or an expected portion of time spent waiting for frames during initial buffering.

The model of the present invention may map hypothetical video buffer state events to an objective score for delivery of streaming media over a reliable network. The model may also support all variations of hypothetical video buffer state events supporting all variations in media session durations.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an interface connectable to a network to monitor a media program streaming across the network to a media client;
a video buffer model to estimate buffering events of a video buffer of the media client during the streaming of the media program based on a modeling of the video buffer; and
a user model coupled to the video buffer model, the user model to generate a variable signal representative of an estimation of a quality of experience of the media program during playback of the media program at the media client, wherein during an estimated buffering event in the playback the user model is to update the variable signal to reflect monotonically increasing user dissatisfaction and wherein during a recovery region following the estimated buffering event in the playback the user model is to update the variable signal to reflect monotonically increasing user satisfaction.

2. The apparatus of claim 1, wherein the variable signal is bound by at least one of an upper threshold and a lower threshold.

3. The apparatus of claim 1, wherein the video buffer model is to change functions used to generate the variable signal based on the estimation of the buffering events.

4. The apparatus of claim 1, wherein the user model reflects user dissatisfaction due to a duration of stalls of playback of the media program.

5. The apparatus of claim 1, wherein the user model reflects user dissatisfaction due to a frequency of stalls of playback of the media program.

6. The apparatus of claim 1, wherein the user model reflects user dissatisfaction due to a location of stalls of playback of the media program.

7. The apparatus of claim 1, wherein the user model reflects user dissatisfaction due to a both a duration of stalls and a frequency of stalls of playback of the media program.

8. The apparatus of claim 1, further comprising:
a media session model coupled to the video buffer model, the media session model to model a media session of said media program, the modeling of the media session incorporating a plurality of session items corresponding to the streaming of said media program; and
wherein the video buffer model estimates buffering events further based on the modeling of the media session.

9. The apparatus of claim 1, wherein the video buffer model utilizes a plurality of programmable buffer fullness thresholds to estimate buffering events.

10. The apparatus of claim 9, wherein one or more of the plurality of programmable buffer fullness thresholds is programmed based at least in part on: a web site address; a device type; and a media player type.

11. The apparatus of claim 1, further comprising:
a hypothetical video buffer model to estimate buffering events for a generalized greedy buffer model that is independent of the video buffer model; and
an objective session model coupled to the hypothetical video buffer model, the objective session model to generate a variable signal representative of an objective estimation of a quality of experience of the media program during playback of the media program at a hypothetical media client.

12. In an apparatus comprising an interface connected to a network to monitor a media program streaming across the network to a media client, a method comprising:
estimating, using a video buffer model, buffering events of a video buffer of the media client during the streaming of the media program based on a modeling of the video buffer; and
generating, using a user model, a variable signal representative of an estimation of a quality of experience of the media program during playback of the media program at the media client, wherein during an estimated buffering event in the playback the user model is to update the variable signal to reflect monotonically increasing user dissatisfaction and wherein during a recovery region following the estimated buffering event in the playback the user model is to update the variable signal to reflect monotonically increasing user satisfaction.

13. The method of claim 12, wherein the variable signal is bound by at least one of an upper threshold and a lower threshold.

14. The method of claim 12, wherein the user model reflects user dissatisfaction due to at least one of: a duration of stalls of playback of the media program; a frequency of stalls of playback of the media program; and a location of stalls of playback of the media program.

15. The method of claim 12, further comprising:
modeling, using a media session model, a media session of said media program, the modeling of the media session incorporating a plurality of session items corresponding to the streaming of said media program; and
wherein estimating buffering events comprises estimating buffering events further based on the modeling of the media session.

16. The method of claim 12, wherein the video buffer model utilizes a plurality of programmable buffer fullness thresholds for estimating buffering events.

17. The method of claim 16, further comprising:
programming one or more of the plurality of programmable buffer fullness thresholds based at least in part on: a web site address; a device type; and a media player type.

18. The method of claim 12, further comprising:
estimating, using a hypothetical video buffer model, buffering events for a generalized greedy buffer model that is independent of the video buffer model; and
generating, using an objective session model, a variable signal representative of an objective estimation of a quality of experience of the media program during playback of the media program at a hypothetical media client.

19. An apparatus comprising:
an interface connectable to a network to monitor a media program streaming across the network to a media client;
a video buffer model to estimate buffering events of a video buffer of the media client during the streaming of the media program based on a modeling of the video buffer; and
a user model coupled to the video buffer model, the user model to generate a variable signal representative of an estimation of a quality of experience of the media program during playback of the media program at the media client, wherein the estimation of the quality of experience reflects user dissatisfaction due to both a location and a duration of each of the estimated buffering events, and wherein in response to the video buffer model indicating an estimated buffering event the user model is to update the variable signal to reflect monotonically increasing dissatisfaction and wherein the user model otherwise is to update the variable signal to reflect monotonically increasing satisfaction.

20. The apparatus of claim 19, wherein the variable signal is bound by at least one of an upper threshold and a lower threshold.

* * * * *